(12) United States Patent
Du et al.

(10) Patent No.: US 11,878,433 B2
(45) Date of Patent: Jan. 23, 2024

(54) METHOD FOR DETECTING GRASPING POSITION OF ROBOT IN GRASPING OBJECT

(71) Applicant: CLOUDMINDS (SHENZHEN) ROBOTICS SYSTEMS CO., LTD., Guangdong (CN)

(72) Inventors: Guoguang Du, Guangdong (CN); Kai Wang, Guangdong (CN); Shiguo Lian, Guangdong (CN)

(73) Assignee: CLOUDMINDS ROBOTICS CO., LTD., Shanghai (CN)

( * ) Notice: Subject to any disclaimer, the term of this patent is extended or adjusted under 35 U.S.C. 154(b) by 784 days.

(21) Appl. No.: 17/032,399

(22) Filed: Sep. 25, 2020

(65) Prior Publication Data

US 2021/0023720 A1   Jan. 28, 2021

Related U.S. Application Data

(63) Continuation of application No. PCT/CN2019/115959, filed on Nov. 6, 2019.

(30) Foreign Application Priority Data

Dec. 12, 2018   (CN) .......................... 201811518381.7

(51) Int. Cl.
*B25J 9/16* (2006.01)
*G06T 7/11* (2017.01)
*G06T 1/00* (2006.01)

(52) U.S. Cl.
CPC .......... *B25J 9/1697* (2013.01); *B25J 9/1669* (2013.01); *G06T 1/0014* (2013.01); *G06T 7/11* (2017.01);
(Continued)

(58) Field of Classification Search
CPC ......... B25J 9/1697; B25J 9/1669; G06T 7/11; G06T 1/0014; G06T 2207/10028; G06T 2207/20081; G06T 2207/20084
(Continued)

(56) References Cited

U.S. PATENT DOCUMENTS 5,325,468 A    6/1994  Terasaki et al.
10,166,676 B1 *  1/2019  Hudson .................. B25J 9/1612
(Continued)

FOREIGN PATENT DOCUMENTS

CN    106041937 A    10/2016
CN    106737692 A    5/2017
(Continued)

OTHER PUBLICATIONS

International Search Report dated Jan. 2, 2020; PCT/CN2019/115959.
(Continued)

*Primary Examiner* — Gabriel I Garcia (57) ABSTRACT

A method for detecting a grasping position of a robot in grasping a target object includes: collecting a target RGB image and a target Depth image of the target object at different view angles; inputting each of the target RGB image to a target object segmentation network for calculation to obtain an RGB pixel region of the target object in the target RGB image and a Depth pixel region of the target object; inputting the RGB pixel region to an optimal grasping position generation network to obtain an optimal grasping position for grasping the target object; inputting the Depth pixel region of the target object and the optimal grasping position to a grasping position quality evaluation network to calculate a score of the optimal grasping posi- (Continued)

tion; and selecting an optimal grasping position corresponding to a highest score as a global optimal grasping position of the robot.

18 Claims, 5 Drawing Sheets

(52) U.S. Cl.
CPC ............... *G06T 2207/10028* (2013.01); *G06T 2207/20081* (2013.01); *G06T 2207/20084* (2013.01)

(58) Field of Classification Search
USPC .......................................................... 382/155
See application file for complete search history.

(56) References Cited

U.S. PATENT DOCUMENTS

| | | | |
|---|---|---|---|
| 2016/0279791 A1 | 9/2016 | Watanabe | |
| 2019/0005848 A1* | 1/2019 | Garcia Kilroy | G09B 23/28 |
| 2020/0171665 A1* | 6/2020 | Kono | B25J 9/1664 |
| 2020/0290206 A1* | 9/2020 | Mukou | B25J 19/023 |

FOREIGN PATENT DOCUMENTS

| | | |
|---|---|---|
| CN | 106780605 A | 5/2017 |
| CN | 106874914 A | 6/2017 |
| CN | 107972026 A | 5/2018 |
| CN | 108058172 A | 5/2018 |
| CN | 108229678 A | 6/2018 |
| CN | 108247601 A | 7/2018 |
| CN | 108280856 A | 7/2018 |
| CN | 108510062 A | 9/2018 |
| CN | 108648233 A | 10/2018 |
| CN | 109658413 A | 4/2019 |
| WO | 2018221614 A1 | 12/2018 |

OTHER PUBLICATIONS

1st Office Action dated Sep. 21, 2021 by the JP Office; Appln.No. 2020-543212.
1st Office Action dated May 25, 2022 by the CN Office; Appln.No. 201811518381.7.

* cited by examiner

METHOD FOR DETECTING GRASPING POSITION OF ROBOT IN GRASPING OBJECT

CROSS-REFERENCE TO RELATED APPLICATION

This application is a continuation of International Application No. PCT/CN2019/115959, filed on Nov. 6, 2019, which claims the benefits of and priority to Chinese Application No. 201811518381.7, filed on Dec. 12, 2018, the entire contents of which are incorporated herein by reference.

TECHNICAL FIELD

Embodiments of the present application relate to the technical field of autonomous grasping for robots, and in particular, relate to a method and apparatus for detecting a grasping position of a robot in grasping a target object, and a computing device and a computer-readable storage medium thereof.

BACKGROUND

In the field of intelligent robots, autonomous grasping of objects is a critical capability for smart robots, especially for domestic robots and industrial robots. With respect to studies of autonomous grasping for the robots, traditional solutions mainly include methods of geometric analysis and methods of data-driven inference. The methods of geometric analysis are quite complex, and methods of data-driven inference exhibit poor effects in complex scenarios.

With the prevailing of deep learning-based methods, the studies of autonomous grasping for the robots achieve great breakthroughs. The state of the art deep learning-based robotic grasping methods could grasp target objects automatically with a high precision, where target objects are segmented automatically, and grasping positions are computed automatically as well.

During the implementation of the present application, it is found that in the related art, automatic segmentation of the target object is mostly based on the Depth image, and an object in a complex background may not be segmented accurately, and the efficiency is low in automatically computing the grasping positions.

SUMMARY

In view of the above, the present application is proposed to provide a method and apparatus for detecting grasping positions of robots in grasping target objects, and a computing device and a computer-readable storage medium thereof, which overcome the above problems or at least partially solve the above problems.

In order to solve the above problem, a solution adopted in an embodiment of the present application provides a method for detecting grasping positions of robot in grasping target object, comprising:
collecting at least one target RGB image and at least one target Depth image of the target object at different view angles, wherein pixel points in the at least one target RGB image have one-to-one corresponding pixel points in the at least one target Depth image;
inputting each of the at least one target RGB image to a target object segmentation network for calculation to obtain an RGB pixel region of the target object in the target RGB image and a Depth pixel region of the target object in the target Depth image;
inputting the RGB pixel region of the target object to an optimal grasping position generation network to obtain an optimal grasping position for grasping the target object;
inputting the Depth pixel region of the target object and the optimal grasping position to a grasping position quality evaluation network to calculate a score of the optimal grasping position; and
selecting an optimal grasping position corresponding to a highest score as a global optimal grasping position for the robot in grasping the target object.

Wherein, the target object segmentation network is a network trained based on a convolutional neural network model, and the target object segmentation network is trained by:
acquiring an RGB image containing the target object;
zooming the RGB image to a first predetermined resolution to obtain a first training set;
annotating a pixel region corresponding to the target object in the first training set;
inputting the first training set and the pixel region corresponding to the target object to the convolutional neural network model for training to obtain the target object segmentation network;
performing an overlap comparison between the RGB pixel region corresponding to the target object obtained by the target object segmentation network and the annotated pixel region corresponding to the target object; and
adjusting a weight of the target object segmentation network according to the overlap comparison result.

Wherein, the optimal grasping position generation network is a network trained based on a convolutional neural network model, and the optimal grasping position generation network is trained by:
zooming the RGB pixel region corresponding to the target object obtained by target object segmentation network to a second predetermined resolution to obtain a second training set;
marking optimal grasping position coordinates for an image in the second training set; and
taking the image in the second training set and the corresponding optimal grasping position coordinates as inputs, and training the inputs based on the convolutional neural network model to obtain the optimal grasping position generation network.

Wherein, the grasping position quality evaluation network is a network trained base on a convolutional neural network model, and the grasping position quality evaluation network is trained by:
acquiring a Depth image containing the target object;
zooming the Depth image to a third predetermined pixel to obtain a third training set;
randomly acquiring a pair of grasping positions on the Depth image in the third training set, and calculating a corresponding score by a predetermined scoring algorithm; and
taking the Depth image, the grasping positions and the score corresponding to the grasping positions as inputs, and training the inputs based on the convolutional neural network model to obtain the grasping position quality evaluation network.

In order to solve the above problem, a solution adopted in another embodiment of the present application provides an apparatus for detecting grasping position of robot in grasping target object, comprising:
- a collecting module, configured to collect a target RGB image and a target Depth image of the target object at different view angles, wherein pixel points in the target RGB image have one-to-one corresponding pixel points in the target Depth image;
- a segmenting module, configured to input each of the at least one target RGB image to a target object segmentation network for calculation to obtain an RGB pixel region of the target object in the target RGB image and a Depth pixel region of the target object in the target Depth image;
- a grasping module, configured to input the RGB pixel region of the target object to an optimal grasping position generation network to obtain an optimal grasping position for grasping the target object;
- an evaluating module, configured to input the Depth pixel region of the target object and the optimal grasping position to a grasping position quality evaluation network to calculate a score of the optimal grasping position; and
- a selecting module, configured to select an optimal grasping position corresponding to a highest score as a global optimal grasping position of the robot.

Wherein, the target object segmentation network in the segmenting module is a network trained based on a convolutional neural network model, and the target object segmentation network is trained by:
- acquiring an RGB image containing the target object;
- zooming the RGB image to a first predetermined resolution to obtain a first training set;
- annotating a pixel region corresponding to the target object in the first training set;
- inputting the first training set and the pixel region corresponding to the target object to the convolutional neural network model for training to obtain the target object segmentation network;
- performing an overlap comparison between the RGB pixel region corresponding to the target object obtained by the target object segmentation network and the annotated pixel region corresponding to the target object; and
- adjusting a weight of the target object segmentation network according to the overlap comparison result.

Wherein, the optimal grasping position generation network in the grasping module is a network trained based on a convolutional neural network model, and the optimal grasping position generation network is trained by:
- zooming the RGB pixel region corresponding to the target object obtained by target object segmentation network to a second predetermined resolution to obtain a second training set;
- marking optimal grasping position coordinates for an image in the second training set; and
- taking the image in the second training set and the corresponding optimal grasping position coordinates as inputs, and training the inputs by the convolutional neural network model to obtain an optimal grasping position generation network.

Wherein, the grasping position quality evaluation network in the evaluating module is a network trained based on a convolutional neural network model, and the grasping position quality evaluation network is trained by:
- acquiring a Depth image containing the target object;
- zooming the Depth image to a third predetermined resolution to obtain a third training set;
- randomly acquiring a pair of grasping positions on the Depth image in the third training set, and calculating a corresponding score by a predetermined scoring algorithm; and
- taking the Depth image, the grasping positions and the score corresponding to the grasping positions as inputs, and training the inputs based on the convolutional neural network model to obtain the grasping position quality evaluation network.

In order to solve the above problem, a solution adopted in yet another embodiment of the present application provides a computing device, comprising: a processor, a memory, a communication interface and a communication bus; wherein the processor, the memory and the communication bus communicate with each other via the communication bus; and the memory is configured to store at least one executable instruction, wherein the at least one executable instruction causes the processor to perform the operations corresponding the method for detecting the grasping position of the robot in grasping the target object.

In order to solve the above problem, a solution adopted in still another embodiment of the present application provides a computer-readable storage medium, the storage medium storing at least one executable instruction; wherein the at least one executable instruction, when being executed, causes the processor to perform the operations corresponding the method for detecting the grasping position of the robot in grasping the target object.

The beneficial effects of the embodiments of the present application over prior art lie in that, in the embodiments of the present application, the pixel region corresponding to the target object is obtained by the target object segmentation network, the pixel region corresponding to the target object is input to the optimal grasping position generation network to obtain the optimal grasping position for grasping the target object, the score of the optimal grasping position is calculated by the grasping position quality evaluation network, and the optimal grasping position corresponding to the highest score is taken as the global optimal grasping position of the robot. According to the present application, the robot could autonomously grasp the target object at the optimal grasping position.

The above is merely a summary of the technical solutions of the present application. In order to make the technical solutions of the present application more clearly, so that it could be implemented, and to make the above and other purposes, features and advantages of the present application more clearly understood, detailed descriptions of the present application are provided as followed.

BRIEF DESCRIPTION OF THE DRAWINGS

By reading the detailed description of preferred embodiments hereinafter, various other advantages and beneficial effects become clear and apparent for persons of ordinary skill in the art. The accompanying drawings are merely for illustrating the preferred embodiments, but shall not be construed as limiting the present application. In all the accompanying drawings, like reference signs denote like parts. In the drawings.

DETAILED DESCRIPTION

Some exemplary embodiments of the present application are hereinafter described in detail with reference to the accompanying drawings. Although the accompanying drawings illustrate the exemplary embodiments of the present application, it shall be understood that the present application may be practiced in various manners, and the present application shall not be limited by the embodiments illustrated herein. On the contrary, these embodiments are described herein only for the purpose of better understanding the present application, and may integrally convey the scope of the present application to a person skilled in the art.

An embodiment of the present application provides a non-volatile computer-readable storage medium, wherein the computer-readable storage medium stores at least one computer-executable instruction, which may be executed to perform the method for detecting the grasping position of the robot in grasping the target object in any of the above method embodiments.

Figure 1:
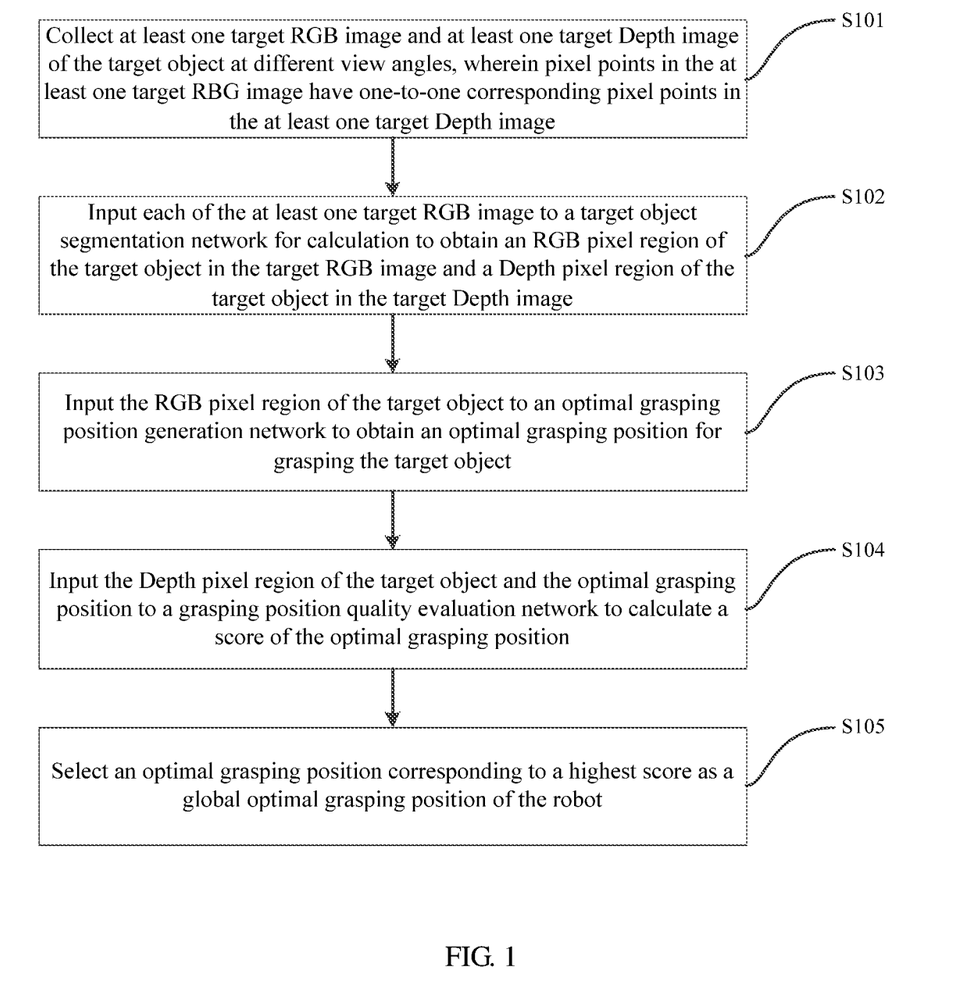
FIG. 1 is a flowchart of a method for detecting a grasping position of a robot in grasping a target object according to an embodiment of the present application.

FIG. 1 is a schematic flowchart of a method for detecting a grasping position of a robot in grasping a target object according to an embodiment of the present application. As illustrated in FIG. 1, the method includes the following steps:

Step S101: At least one target RGB image and at least one target Depth image of the target object at different view angles are collected, wherein pixel points in the at least one target RGB image have one-to-one corresponding pixel points in the at least one target Depth image.

In this step, the target object is placed on a desk under the robot arm of the robot, and an RGB image and a Depth image at the current position are acquired, wherein pixels in the RGB image have one-to-one corresponding pixels in the Depth image. The robot arm is moved to re-collect images from other angles. In the embodiment of the present application, images at eight positions, front, rear, left, right, upper front, upper rear, upper left and upper right are collected.

Step S102: Each of the at least one target RGB image is input to a target object segmentation network for calculation to obtain an RGB pixel region of the target object in the target RGB image and a Depth pixel region of the target object in the target Depth image.

In this step, each of the at least one target RGB image is input to the target object segmentation network for calculation to obtain the RGB pixel region of the target object in the target RGB image. The RGB images one-to-one correspond to the Depth images. Therefore, the Depth pixel region of the target object in the target Depth image may be positioned according to the RGB pixel region of the target object in the target RGB image.

Figure 2:
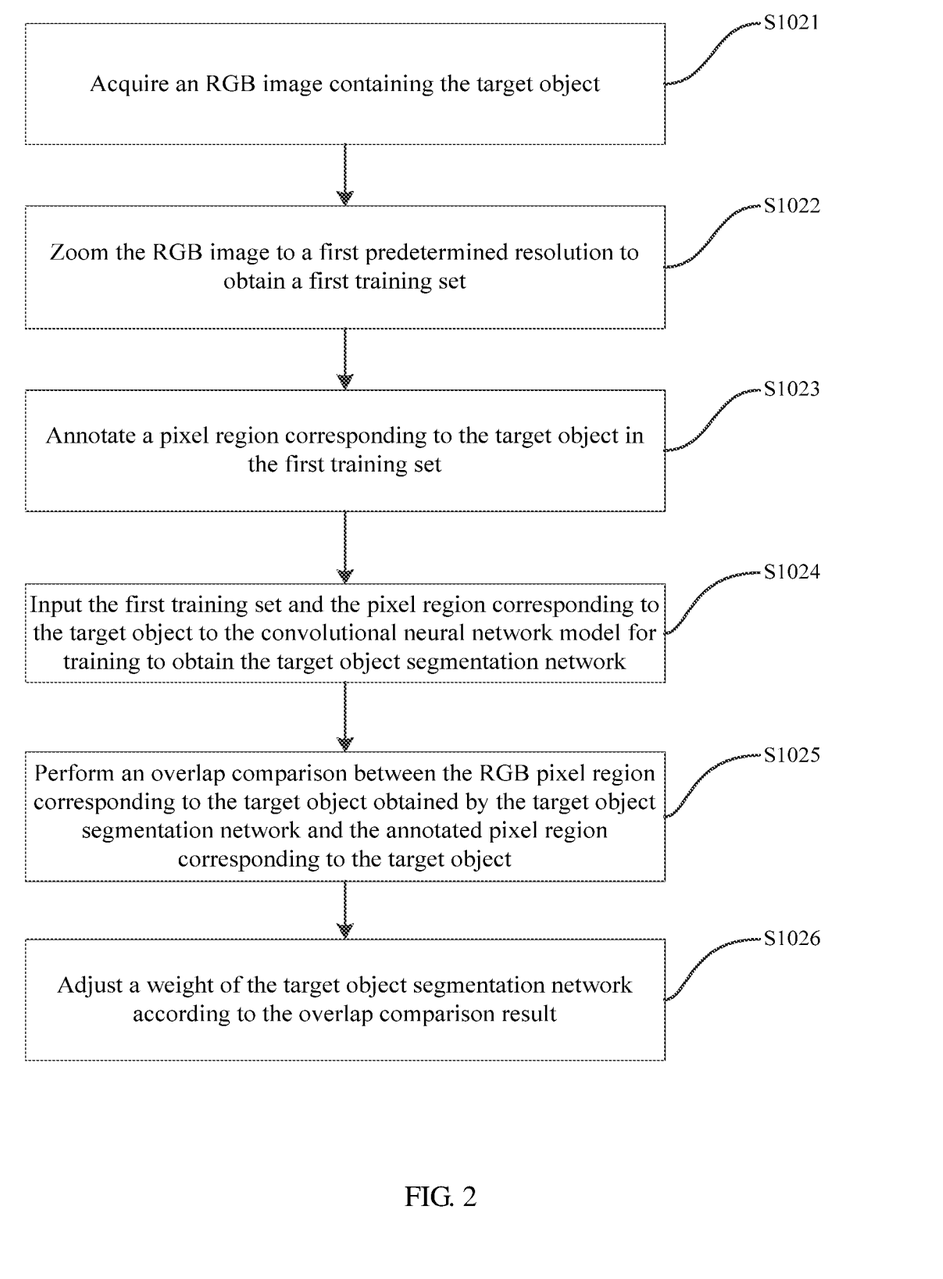
FIG. 2 is a flowchart of training a target object segmentation network according to an embodiment of the present application.

It should be noted that the target object segmentation network is a network trained based on a convolutional neural network model. FIG. 2 is a flowchart of training a target object segmentation network according to an embodiment of the present application. As illustrated in FIG. 2, the target object segmentation network is trained by the following steps:

Step S1021: An RGB image containing the target object is acquired.

Step S1022: The RGB image is zoomed to a first predetermined resolution to obtain a first training set.

In this step, each RGB image is zoomed to the first predetermined resolution to accommodate the network structure. In the embodiment of the present application, the first predetermined resolution is a 320×320 pixel.

Step S1023: A pixel region corresponding to the target object in the first training set is annotated.

In this step, the pixel region corresponding to the target object is manually annotated. For example, the position of the pixel region corresponding to the target object in an image in the training set is annotated by a block.

Step S1024: The first training set and the pixel region corresponding to the target object are input to the convolutional neural network model for training to obtain the target object segmentation network.

In this step, the convolutional neural network model is any one of the mainstream convolutional neural network-based models for object segmentation, for example, a segmentation network (SegNet), a deep laboratory network (DeepLab v1, DeepLab v2, DeepLab v3, DeepLab v3++), a pyramid scene parsing network (PSPNet), and an image cascade network (ICNet). In the embodiment of the present application, by the segmentation network (SegNet), the pixel region corresponding to the target object is taken as one category, the pixel region corresponding to the background not containing the target object as one category, and the first training set and the pixel region corresponding to the target object are input to the convolutional neural network model for training. In the embodiment of the present application, the convolutional neural network model has 27 layers, during the training, the pixel region corresponding to the target object is extracted by a convolutional extraction layer, and meanwhile, the image is zoomed to the first predetermined pixel size. This process is referred to as encoder. Features of the target object upon the classification are reproduced by de-convolutional calculation, and a target size of the pixel region corresponding to the target object is restored by up-sampling. This process is referred to as a decoder. A probability of each pixel category is calculated by taking outputs of the decoder as inputs of a soft-max classifier, and the pixel region corresponding to the target object is determined according to the probability.

Step S1025: An overlap comparison is performed between the RGB pixel region corresponding to the target object obtained by the target object segmentation network and the annotated pixel region corresponding to the target object.

In this step, the image containing the target object is taken as an input of the target object segmentation network to obtain the RGB pixel region obtained by the target object segmentation network, and the overlap comparison is performed between the pixel region obtained by the target object segmentation network and the annotated pixel region corresponding to the target object. A result of the overlap comparison is taken as an evaluation metric of the target object segmentation network.

Step S1026: A weight of the target object segmentation network is adjusted according to the overlap comparison result.

In this step, the overlap comparison result is compared with a predetermined overlap comparison result threshold. If the overlap comparison result is lower than the predetermined overlap comparison result threshold, the structure and the weight of the neural network are adjusted.

Step S103: The RGB pixel region of the target object is input to an optimal grasping position generation network to obtain an optimal grasping position for grasping the target object.

Figure 3:
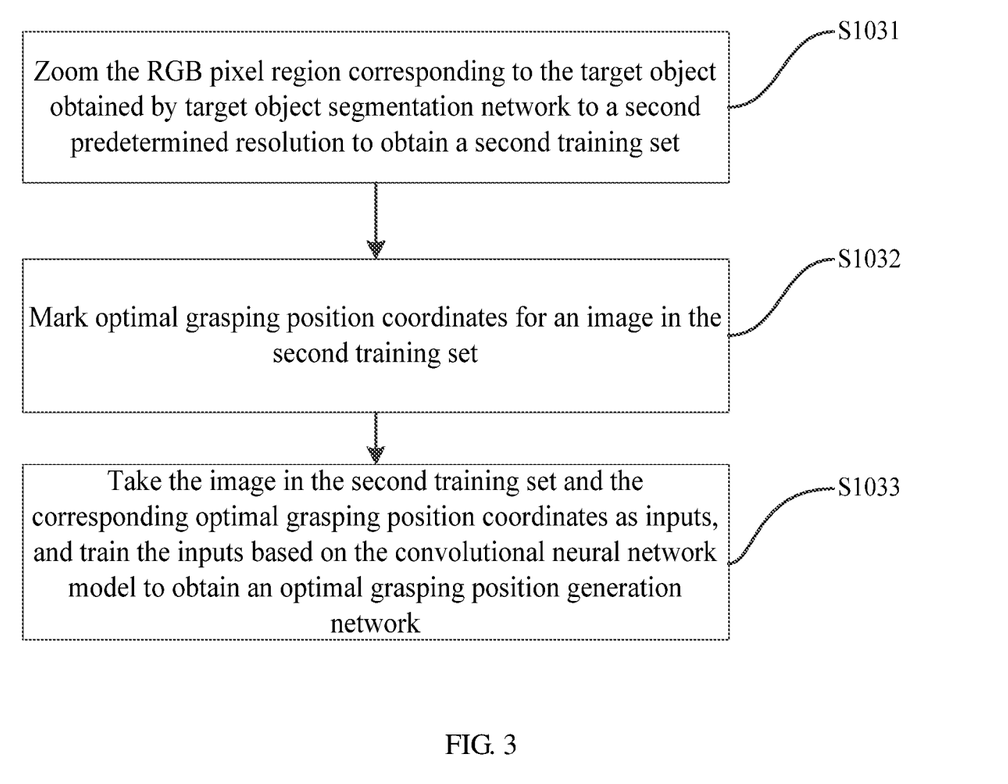
FIG. 3 is a flowchart of training an optimal grasping position generation network according to an embodiment of the present application.

In this embodiment, the optimal grasping position generation network is a network trained based on the convolutional neural network model. FIG. 3 is a flowchart of training an optimal grasping position generation network according to an embodiment of the present application. As illustrated in FIG. 3, the optimal grasping position generation network is trained by the following steps:

Step S1031: The RGB pixel region corresponding to the target object obtained by target object segmentation network is zoomed to a second predetermined resolution to obtain a second training set.

In this step, the RGB pixel region corresponding to the target object is zoomed to a second predetermined resolution to accommodate the network structure. In the embodiment of the present application, the second predetermined resolution is a 227×227 pixel.

Step S1032: Optimal grasping position coordinates are marked for an image in the second training set.

In this step, for images in the second training set, (X, Y, θ) is marked as the grasping position of the target object, wherein (X, Y) denotes a grasping point, θ denotes a grasping angle. During the annotation of the grasping position, firstly the grasping angle is defined, and then an optimal grasping position under each grasping angle is marked. For example, a grasping angle range [0, 180°] is evenly partitioned into 18 angle values, and the optimal grasping position coordinates under each angle are marked. In the embodiment of the present application, in order to increase of the number of images in the training data set, the grasping angle and the optimal grasping position coordinates are annotated for each image in the second training set.

Step S1033: The image in the second training set and the corresponding optimal grasping position coordinates are taken as inputs, and the inputs are trained based on the convolutional neural network model to obtain an optimal grasping position generation network.

In this step, the convolutional neural network model is any of the conventional convolutional neural network models. In the embodiment of the present application, by an AlexNet model, the image in the second training set and the corresponding optimal grasping position (X, Y, θ) are taken as inputs of the convolutional neural network model, wherein the AlexNet model has seven layers, including five convolutional layers and 2 full-connection layers. By training using the AlexNet model, the optimal grasping position generation network is obtained, a Euclidean distance between a predicted grasping point (Xp, Yp) output by the optimal grasping position generation network and a marker point (X, Y) is calculated, and the weight of the optimal grasping position generation network is adjusted by a Softmax loss function according to the Euclidean distance.

Step S104: The Depth pixel region of the target object and the optimal grasping position are input to a grasping position quality evaluation network to calculate a score of the optimal grasping position.

Figure 4:
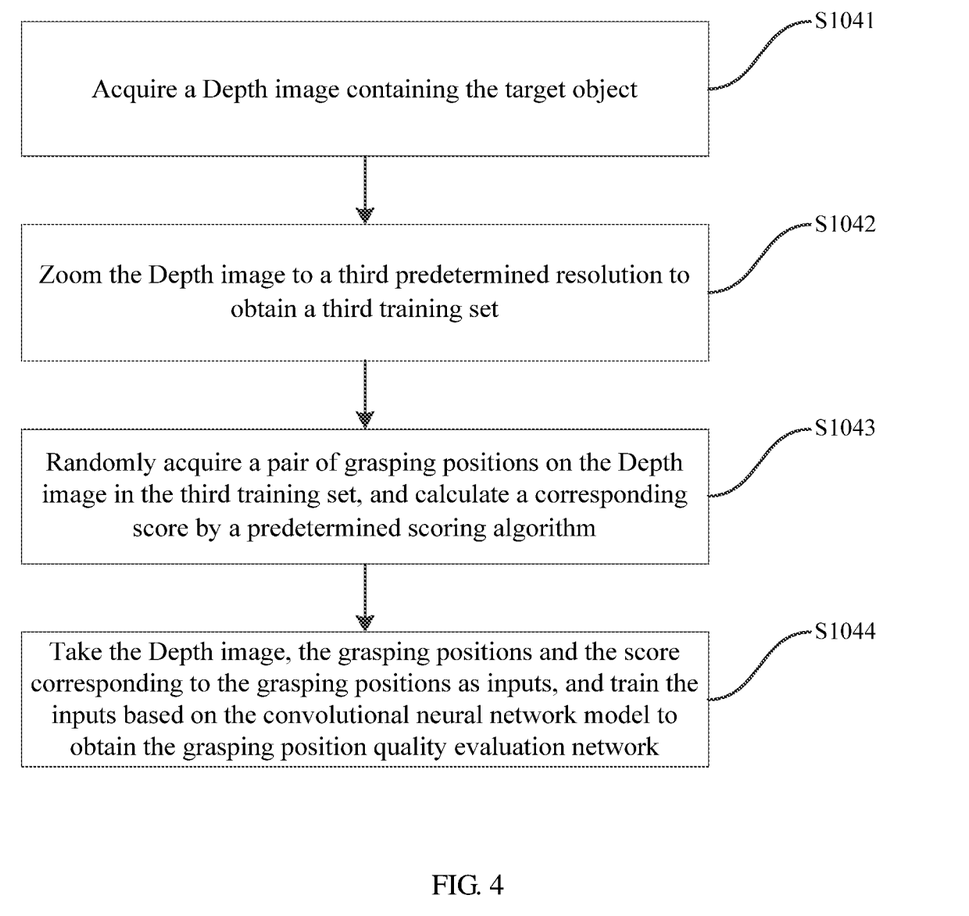
FIG. 4 is a flowchart of training a grasping position quality evaluation network according to an embodiment of the present application.

In this embodiment, the grasping position quality evaluation network is a network trained based on the convolutional neural network model. FIG. 4 is a flowchart of training a grasping position quality evaluation network according to an embodiment of the present application. As illustrated in FIG. 4, the grasping position quality evaluation network is trained by the following steps:

Step S1041: A Depth image containing the target object is acquired.

In this step, the Depth image refers to a Depth image obtained according to the RGB image, wherein pixels in the Depth image have one-to-one corresponding pixels in the RGB image.

Step S1042: The Depth image is zoomed to a third predetermined resolution to obtain a third training set.

In this step, each Depth image is zoomed to the third predetermined resolution to accommodate the network structure. In the embodiment of the present application, the third predetermined resolution is a 32×32 pixel.

Step S1043: A pair of grasping positions are randomly acquired on the Depth image in the third training set, and a corresponding score is calculated by a predetermined scoring algorithm.

Step S1044: The Depth image, the grasping positions and the score corresponding to the grasping positions are taken as inputs, and the inputs are trained based on the convolutional neural network model to obtain the grasping position quality evaluation network.

In this step, the convolutional neural network includes nine layers, wherein four layers are convolutional layers, one layer is a pool layer and four layers are fully-connected layers. The score output by the grasping position quality evaluation network is compared with the score obtained by the predetermined score algorithm in step S1043, and then the weight of the grasping position quality evaluation network is adjusted according to the comparison result.

Step S105: An optimal grasping position corresponding to a highest score is selected as a global optimal grasping position of the robot.

In the method for detecting the grasping position of the robot in grasping the target object according to the embodiment of the present application, the pixel region corresponding to the target object is obtained by the target object segmentation network, the pixel region corresponding to the target object is input to the optimal grasping position generation network to obtain the optimal grasping position for grasping the target object, the score of the optimal grasping position is calculated by the grasping position quality evaluation network, and the optimal grasping position corresponding to the highest score is taken as the global optimal grasping position of the robot. According to the present application, the robot could autonomously grasp the target object at the optimal grasping position.

Figure 5:
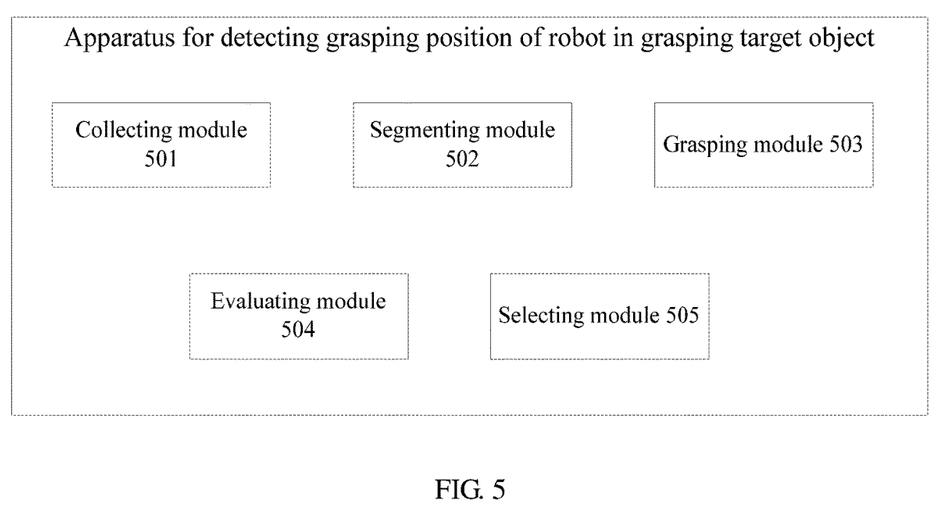
FIG. 5 is a functional diagram of an apparatus for detecting a grasping position of a robot in grasping a target object according to an embodiment of the present application.

FIG. 5 is a functional block diagram of an apparatus for detecting a grasping position of a robot in grasping a target object according to an embodiment of the present application. As illustrated in FIG. 5, the apparatus includes: a collecting module 501, a segmenting module 502, a grasping module 503, an evaluating module 504 and a selecting module 505. The collecting module 501 is configured to collect at least one target RGB image and at least one target Depth image of the target object at different view angles, wherein pixel points in the target RGB image have one-to-one corresponding pixel points in the target Depth image. The segmenting module 502 is configured to input each of the at least one target RGB image to a target object segmentation network for calculation to obtain an RGB pixel region of the target object in the target RGB image and a Depth pixel region of the target object in the target Depth image. The grasping module 503 is configured to input the RGB pixel region of the target object to an optimal grasping position generation network to obtain an optimal grasping position for grasping the target object. The evaluating module 504 is configured to input the Depth pixel region of the target object and the optimal grasping position to a grasping position quality evaluation network to calculate a score of the optimal grasping position. The selecting module 505 is configured to select an optimal grasping position corresponding to a highest score as a global optimal grasping position of the robot.

In this embodiment, the target object segmentation network in the segmenting module 502 is a network trained based on a convolutional neural network model, and the network is trained by:

acquiring an RGB image containing the target object;
zooming the RGB image to a first predetermined resolution to obtain a first training set;
annotating a pixel region corresponding to the target object in the first training set;
inputting the first training set and the pixel region corresponding to the target object to the convolutional neural network model for training to obtain the target object segmentation network;
performing an overlap comparison between the RGB pixel region corresponding to the target object obtained by the target object segmentation network and the annotated pixel region corresponding to the target object; and
adjusting a weight of the target object segmentation network according to the overlap comparison result.

Further, the optimal grasping position generation network in the grasping module 503 is a network trained based on a convolutional neural network model, and the network is trained by:

zooming the RGB pixel region corresponding to the target object obtained by target object segmentation network to a second predetermined resolution to obtain a second training set;
marking optimal grasping position coordinates for an image in the second training set; and
taking the image in the second training set and the corresponding optimal grasping position coordinates as inputs, and training the inputs based on the convolutional neural network model to obtain an optimal grasping position generation network model.

Further, the grasping position quality evaluation network in the evaluating module 504 is a network trained based on a convolutional neural network model, and the network is trained by:

acquiring a Depth image containing the target object;
zooming the Depth image to a predetermined third resolution to obtain a third training set;
acquiring a pair of grasping positions on the Depth image in the third training set, and calculating a corresponding score by a predetermined scoring algorithm; and
taking the Depth image, the grasping positions and the score corresponding to the grasping positions as inputs, and training the inputs based on the convolutional neural network model to obtain the grasping position quality evaluation network.

In the apparatus for detecting the grasping position of the robot in grasping the target object according to the embodiment of the present application, the pixel region corresponding to the target object is obtained by the segmenting module, the optimal grasping position of the target object is obtained by the grasping module, the score of the optimal grasping position is calculated by the evaluating module, and the optimal grasping position corresponding to the highest score is taken as the global optimal grasping position of the robot. According to the present application, the robot could autonomously grasp the target object at the optimal grasping position.

Figure 6:
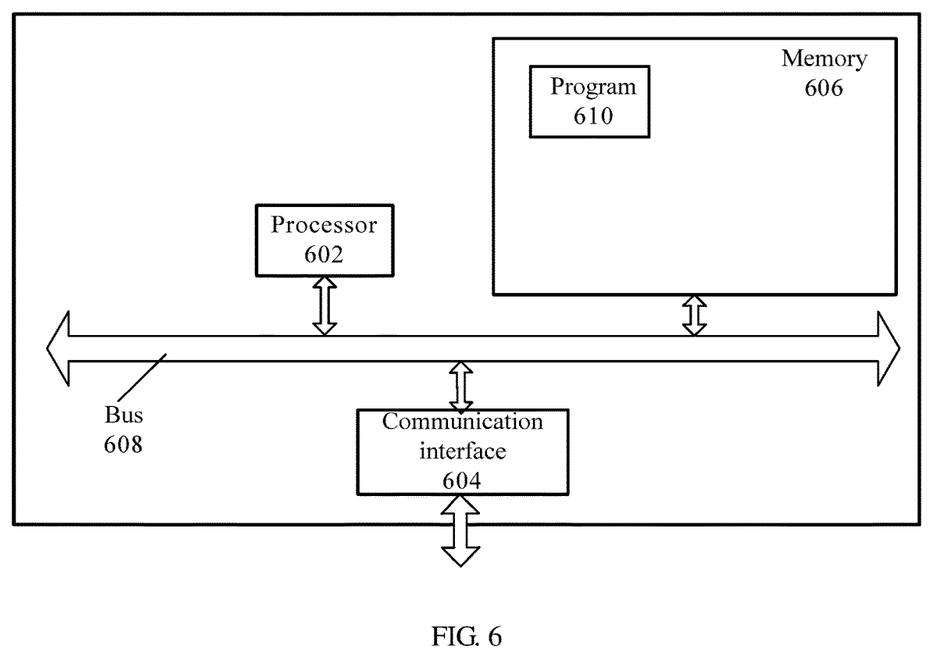
FIG. 6 is a schematic diagram of a computing device according to an embodiment of the present application.

FIG. 6 is a schematic structural diagram of a computing device according to an embodiment of the present application. The specific embodiments of the present application set no limitation to the practice of the computing device.

As illustrated in FIG. 6, the computing device may include: a processor 602, a communication interface 604, a memory 606 and a communication bus 608.

The processor 602, the communication interface 604 and the memory 606 communicate with each other via the communication bus 608.

The communication interface 604 is configured to communicate with another device.

The processor 602 is configured to execute the program 610, and may specifically perform steps in the embodiments of the method for detecting the grasping position of the robot in grasping the target object.

Specifically, the program 610 may include a program code, wherein the program code includes a computer-executable instruction.

The processor 602 may be a central processing unit (CPU) or an application specific integrated circuit (ASIC), or configured as one or more integrated circuits for implementing the embodiments of the present application. The computing device includes one or more processors, which may be the same type of processors, for example, one or more CPUs, or may be different types of processors, for example, one or more CPUs and one or more ASICs.

The memory 606 is configured to store the program 610. The memory 606 may include a high-speed RAM memory, or may also include a non-volatile memory, for example, at least one magnetic disk memory.

The program 610 may be specifically configured to cause the processor 602 to perform the following operations:

collecting at least one target RGB image and at least one target Depth image of the target object at different view angles, wherein pixel points in the at least one target RGB image have one-to-one corresponding pixel points in the at least one target Depth image;
inputting each of the at least one target RGB image to a target object segmentation network for calculation to obtain an RGB pixel region of the target object in the target RGB image and a Depth pixel region of the target object in the target Depth image;
inputting the RGB pixel region of the target object to an optimal grasping position generation network to obtain an optimal grasping position of the target object;
inputting the Depth pixel region of the target object and the optimal grasping position to a grasping position quality evaluation network to calculate a score of the optimal grasping position; and
selecting an optimal grasping position corresponding to a highest score as a global optimal grasping position of the robot.

In an optional implementation, when the target object segmentation network is a network trained based on a convolutional neural network model, the program 610 may be further configured to cause the processor 602 to perform the following operations:

acquiring an RGB image containing the target object;
zooming the RGB image to a predetermined first resolution to obtain a first training set;
annotating a pixel region corresponding to the target object in the first training set;

inputting the first training set and the pixel region corresponding to the target object to the convolutional neural network model for training to obtain the target object segmentation network;

performing an overlap comparison between the RGB pixel region corresponding to the target object obtained by the target object segmentation network and the annotated pixel region corresponding to the target object; and adjusting a weight of the target object segmentation network according to the overlap comparison result.

In an optional implementation, the program 610 may be specifically further configured to cause the processor 602 to perform the following operations:

zooming the RGB pixel region corresponding to the target object obtained by target object segmentation network to a second predetermined resolution to obtain a second training set;

marking optimal grasping position coordinates for an image in the second training set; and taking the image in the second training set and the corresponding optimal grasping position coordinates as inputs, and training the inputs based on the convolutional neural network model to obtain an optimal grasping position generation network.

In an optional implementation, the program 610 may be specifically further configured to cause the processor 602 to perform the following operations:

acquiring a Depth image containing the target object;

zooming the Depth image to a predetermined third resolution to obtain a third training set;

acquiring a pair of grasping positions on the Depth image in the third training set, and calculating a corresponding score by a predetermined scoring algorithm; and taking the Depth image, the grasping positions and the score corresponding to the grasping positions as inputs, and training the inputs based on the convolutional neural network model to obtain the grasping position quality evaluation network.

The algorithms and displays provided herein are not inherently related to any specific computer, virtual system or other devices. Various general-purpose systems may also be used with the teachings herein. According to the above description, the structure required for constructing such systems is obvious. In addition, the present application is not directed to any specific programming language. It should be understood that the content of the present application described herein may be carried out utilizing various programming languages, and that the above description for a specific language is for the sake of disclosing preferred embodiments of the present application.

In the specification provided herein, a plenty of particular details are described. However, it may be appreciated that an embodiment of the present application may also be practiced without these particular details. In some embodiments, well known methods, structures and technologies are not illustrated in detail so as not to obscure the understanding of the specification.

Likewise, it shall be understood that, to streamline the present application and facilitate understanding of one or more of various aspects of the present application, in the above description of the exemplary embodiments of the present application, various features of the present application are sometimes incorporated in an individual embodiment, drawing or description thereof. However, the method according to the present application shall not be explained to embody the following intension: the present application seeking protection claims more features than those explicitly disclosed in each of the appended claims. To be more exact, as embodied in the appended claims, the inventive aspects lie in that fewer features than all the features embodied in an individual embodiment as described above. Therefore, the claims observing the specific embodiments are herein incorporated into the specific embodiments, and each claim may be deemed as an individual embodiment of the present application.

Those skilled in the art should understand that modules in the devices according to the embodiments may be adaptively modified and these modules may be configured in one or more devices different from the embodiments herein. Modules or units or components in the embodiments may be combined into a single module or unit or component, and additionally these modules, units or components may be practiced in a plurality of sub-modules, subunits or subcomponents. Besides that such features and/or processes or at least some of the units are mutually exclusive, all the features disclosed in this specification (including the appended claims, abstract and accompanying drawings) and all the processes or units in such disclosed methods or devices may be combined in any way. Unless otherwise stated, each of the features disclosed in this specification (including the appended claims, abstract and accompanying drawings) may be replaced by a provided same, equivalent or similar substitution.

In addition, those skilled in the art shall understand that, although some embodiments described herein include some features included in other embodiments, rather than other features, a combination of the features in different embodiments signifies that the features are within the scope of the present application and different embodiments may be derived. For example, in the claims appended hereinafter, any one of the embodiments for which protection is sought may be practiced in any combination manner.

Embodiments of the individual components of the present application may be implemented in hardware, or in a software module running one or more processors, or in a combination thereof. It will be appreciated by those skilled in the art that, in practice, some or all of the functions of some or all of the components in the apparatus for detecting the grasping position of the robot in grasping the target object according to individual embodiments of the present application may be implemented using a microprocessor or a digital signal processor (DSP). The present application may also be implemented as an apparatus of a device program (e.g., a computer program and a computer program product) for performing a part or all of the method as described herein. Such a program implementing the present application may be stored on a computer readable medium, or may be stored in the form of one or more signals. Such a signal may be obtained by downloading it from an Internet website, or provided on a carrier signal, or provided in any other form.

It should be noted that the above embodiments illustrate rather than limit the present application, and those skilled in the art may design alternative embodiments without departing from the scope of the appended claims. In the claims, any reference sign placed between the parentheses shall not be construed as a limitation to a claim. The word "comprise" or "include" does not exclude the presence of an element or a step not listed in a claim. The word "a" or "an" used before an element does not exclude the presence of a plurality of such elements. The present application may be implemented by means of a hardware comprising several distinct elements and by means of a suitably programmed computer. In a unit claim enumerating several devices, several of the devices may be embodied by one and the same hardware item. Use of the words "first", "second", "third" and the like does not mean any ordering. Such words may be construed as naming.

What is claimed is:

1. A method for detecting a grasping position of a robot in grasping a target object, comprising:
    collecting at least one target RGB image and at least one target Depth image of the target object at different view angles, wherein pixel points in the at least one target RGB image have one-to-one corresponding pixel points in the at least one target Depth image;
    inputting each of the at least one target RGB image to a target object segmentation network for calculation to obtain an RGB pixel region of the target object in the target RGB image and a Depth pixel region of the target object in the target Depth image;
    inputting the RGB pixel region of the target object to an optimal grasping position generation network to obtain an optimal grasping position for grasping the target object;
    inputting the Depth pixel region of the target object and the optimal grasping position to a grasping position quality evaluation network to calculate a score of the optimal grasping position; and
    selecting an optimal grasping position corresponding to a highest score as a global optimal grasping position of the robot.

2. The method according to claim 1, wherein
    the target object segmentation network is a network trained based on a convolutional neural network model, wherein the target object segmentation network is trained by:
    acquiring an RGB image containing the target object;
    zooming the RGB image to a first predetermined resolution to obtain a first training set;
    annotating a pixel region corresponding to the target object in the first training set;
    inputting the first training set and the pixel region corresponding to the target object to the convolutional neural network model for training to obtain the target object segmentation network;
    performing an overlap comparison between the RGB pixel region corresponding to the target object obtained by the target object segmentation network and the annotated pixel region corresponding to the target object; and
    adjusting a weight of the target object segmentation network according to the overlap comparison result.

3. The method according to claim 1, wherein the optimal grasping position generation network is a network trained based on a convolutional neural network model, and the optimal grasping position generation network is trained by:
    zooming the RGB pixel region corresponding to the target object obtained based on the target object segmentation network to a second predetermined resolution to obtain a second training set;
    marking optimal grasping position coordinates for an image in the second training set; and
    taking the image in the second training set and the corresponding optimal grasping position coordinates as inputs, and training the inputs based on the convolutional neural network model to obtain the optimal grasping position generation network.

4. The method according to claim 1, wherein the grasping position quality evaluation network is a network trained based on a convolutional neural network model, and the grasping position quality evaluation network is trained by:
    acquiring a Depth image containing the target object;
    zooming the Depth image to a third predetermined resolution to obtain a third training set;
    randomly acquiring a pair of grasping positions on the Depth image in the third training set, and calculating a corresponding score by a predetermined scoring algorithm; and
    taking the Depth image, the grasping positions and the score corresponding to the grasping positions as inputs, and training the inputs based on the convolutional neural network model to obtain the grasping position quality evaluation network.

5. The method according to claim 2, wherein the first predetermined resolution is a 320×320 pixel.

6. The method according to claim 3, wherein the second predetermined resolution is a 227×227 pixel.

7. The method according to claim 4, wherein the third predetermined resolution is a 32×32 pixel.

8. A computing device, comprising: a processor, a memory, a communication interface and a communication bus; wherein the processor, the memory and the communication bus communicate with each other via the communication bus; and
    the memory is configured to store at least one executable instruction, wherein the at least one executable instruction causes the processor to perform the steps of:
    collecting at least one target RGB image and at least one target Depth image of the target object at different view angles, wherein pixel points in the at least one target RGB image have one-to-one corresponding pixel points in the at least one target Depth image;
    inputting each of the at least one target RGB image to a target object segmentation network for calculation to obtain an RGB pixel region of the target object in the target RGB image and a Depth pixel region of the target object in the target Depth image;
    inputting the RGB pixel region of the target object to an optimal grasping position generation network to obtain an optimal grasping position for grasping the target object;
    inputting the Depth pixel region of the target object and the optimal grasping position to a grasping position quality evaluation network to calculate a score of the optimal grasping position; and
    selecting an optimal grasping position corresponding to a highest score as a global optimal grasping position of the robot.

9. The computing device according to claim 8, wherein the target object segmentation network is a network trained based on a convolutional neural network model, wherein the target object segmentation network is trained by:
    acquiring an RGB image containing the target object;
    zooming the RGB image to a first predetermined resolution to obtain a first training set;
    annotating a pixel region corresponding to the target object in the first training set;
    inputting the first training set and the pixel region corresponding to the target object to the convolutional neural network model for training to obtain the target object segmentation network;
    performing an overlap comparison between the RGB pixel region corresponding to the target object obtained by the target object segmentation network and the annotated pixel region corresponding to the target object; and adjusting a weight of the target object segmentation network according to the overlap comparison result.

10. The computing device according to claim 8, wherein the optimal grasping position generation network is a network trained based on a convolutional neural network model, and the optimal grasping position generation network is trained by:

zooming the RGB pixel region corresponding to the target object obtained based on the target object segmentation network to a second predetermined resolution to obtain a second training set;

marking optimal grasping position coordinates for an image in the second training set; and taking the image in the second training set and the corresponding optimal grasping position coordinates as inputs, and training the inputs based on the convolutional neural network model to obtain the optimal grasping position generation network.

11. The computing device according to claim 8, wherein the grasping position quality evaluation network is a network trained based on a convolutional neural network model, and the grasping position quality evaluation network is trained by:

acquiring a Depth image containing the target object;

zooming the Depth image to a third predetermined resolution to obtain a third training set;

randomly acquiring a pair of grasping positions on the Depth image in the third training set, and calculating a corresponding score by a predetermined scoring algorithm; and taking the Depth image, the grasping positions and the score corresponding to the grasping positions as inputs, and training the inputs based on the convolutional neural network model to obtain the grasping position quality evaluation network.

12. The computing device according to claim 9, wherein the first predetermined resolution is a 320×320 pixel.

13. The computing device according to claim 10, wherein the second predetermined resolution is a 227×227 pixel.

14. The computing device according to claim 11, wherein the third predetermined resolution is a 32×32 pixel.

15. A computer-readable storage medium, the storage medium storing at least one executable instruction; wherein the at least one executable instruction, when being executed, causes the processor to perform the steps of:

collecting at least one target RGB image and at least one target Depth image of the target object at different view angles, wherein pixel points in the at least one target RGB image have one-to-one corresponding pixel points in the at least one target Depth image;

inputting each of the at least one target RGB image to a target object segmentation network for calculation to obtain an RGB pixel region of the target object in the target RGB image and a Depth pixel region of the target object in the target Depth image;

inputting the RGB pixel region of the target object to an optimal grasping position generation network to obtain an optimal grasping position for grasping the target object;

inputting the Depth pixel region of the target object and the optimal grasping position to a grasping position quality evaluation network to calculate a score of the optimal grasping position; and selecting an optimal grasping position corresponding to a highest score as a global optimal grasping position of the robot.

16. The computer-readable storage medium according to claim 15, wherein the target object segmentation network is a network trained based on a convolutional neural network model, wherein the target object segmentation network is trained by:

acquiring an RGB image containing the target object;

zooming the RGB image to a first predetermined resolution to obtain a first training set;

annotating a pixel region corresponding to the target object in the first training set;

inputting the first training set and the pixel region corresponding to the target object to the convolutional neural network model for training to obtain the target object segmentation network;

performing an overlap comparison between the RGB pixel region corresponding to the target object obtained by the target object segmentation network and the annotated pixel region corresponding to the target object; and adjusting a weight of the target object segmentation network according to the overlap comparison result.

17. The computer-readable storage medium according to claim 15, wherein the optimal grasping position generation network is a network trained based on a convolutional neural network model, and the optimal grasping position generation network is trained by:

zooming the RGB pixel region corresponding to the target object obtained by target object segmentation network to a second predetermined resolution to obtain a second training set;

marking optimal grasping position coordinates for an image in the second training set; and taking the image in the second training set and the corresponding optimal grasping position coordinates as inputs, and training the inputs based on the convolutional neural network model to obtain the optimal grasping position generation network.

18. The computer-readable storage medium according to claim 15, wherein the grasping position quality evaluation network is a network trained based on a convolutional neural network model, and the grasping position quality evaluation network is trained by:

acquiring a Depth image containing the target object;

zooming the Depth image to a third predetermined resolution to obtain a third training set;

randomly acquiring a pair of grasping positions on the Depth image in the third training set, and calculating a corresponding score by a predetermined scoring algorithm; and taking the Depth image, the grasping positions and the score corresponding to the grasping positions as inputs, and training the inputs based on the convolutional neural network model to obtain the grasping position quality evaluation network.

* * * * *